US006209466B1

(12) United States Patent
Wodrich

(10) Patent No.: US 6,209,466 B1
(45) Date of Patent: Apr. 3, 2001

(54) TWO PIECE SEED BOOT FOR A SEEDING MACHINE

(75) Inventor: Timothy Dirk Wodrich, Rock Island, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/310,541

(22) Filed: May 12, 1999

(51) Int. Cl.$^7$ .................................................. A01C 13/00
(52) U.S. Cl. .................. 111/189; 111/200; 172/753; 172/772
(58) Field of Search ................................. 111/154, 189, 111/186, 170, 200, 14, 69, 73, 76, 80, 81; 172/747, 751, 753, 772, 719, 726

(56) References Cited

U.S. PATENT DOCUMENTS

| | | | |
|---|---|---|---|
| 750,985 | * | 2/1904 | Lane ........................................ 172/751 |
| 966,411 | * | 8/1910 | Allen ....................................... 172/751 |
| 2,031,548 | * | 2/1936 | Romine et al. ......................... 172/753 |
| 4,633,791 | * | 1/1987 | Lindstrom et al. .................... 111/186 |
| 4,760,806 | | 8/1988 | Bigbee et al. ............................ 111/87 |
| 4,799,823 | * | 1/1989 | Williams ........................... 172/753 X |
| 5,092,255 | | 3/1992 | Long et al. ............................. 111/167 |
| 5,119,888 | * | 6/1992 | Hall ................................... 172/719 X |
| 5,325,799 | * | 7/1994 | Rowlett ................................. 111/152 |
| 5,522,328 | | 6/1996 | Long ...................................... 111/176 |
| 5,542,363 | | 8/1996 | Gamino ................................. 111/170 |
| 5,562,055 | * | 10/1996 | Petersen ............................... 111/195 |
| 5,787,994 | * | 8/1998 | Friesen ............................. 172/753 X |
| 6,032,593 | * | 3/2000 | Wendling et al. .................... 111/187 |
| 6,059,047 | * | 5/2000 | Schimke .............................. 172/769 |

FOREIGN PATENT DOCUMENTS

| | | |
|---|---|---|
| 352 993 | 8/1928 | (BE) . |
| 40 39 966 | 6/1992 | (DE) . |
| 0 898 860 | 8/1997 | (DE) . |

OTHER PUBLICATIONS

John Deere Parts Catalog, (John Deere Des Moines Works PC 2246–Nov.–96), titled "750 Series Grain Drill", front and back pages, as well as pages A3, D1, and D2, printed in the U.S.A.

John Deere Brochure FMO–121B titled "Fundamentals of Machine Operation—Planting", front and back pages as well as pp. ii, 95–120, printed in the U.S.A., 1975.

John Deere Brochure DKA147 titled "No–Till Drills", front and back pages as well as pp. 3 –15, printed in the U.S.A.

* cited by examiner

Primary Examiner—Victor Batson

(57) ABSTRACT

A two piece seed boot for a seeding machine has a upper cast portion and a lower cast portion. Both the upper and lower portions are provided with aligned seed passages which received metered seed from the seed tube and discharge the metered seed to the planting furrow. The upper cast portion is mounted to the planting unit frame and the seed tube by an integral mounting clevis. The lower cast portion is provided with first and second upward extending mounting lugs. The first mounting lug is received in a recess formed in the upper portion. The second mounting lug engages the planting furrow side of the upper portion. The rear of the upper and lower portions are provided with aligned mounting holes through which a mounting bolt passes securing the lower portion to the upper portion.

5 Claims, 4 Drawing Sheets

TWO PIECE SEED BOOT FOR A SEEDING MACHINE

BACKGROUND OF THE INVENTION

1. Field of the Invention

The present invention is directed to a two piece seed boot for a seeding machine, wherein the high wear portion of the seed boot can be replaced as needed.

2. Description of the Prior Art

Grain drills and air seeders are seeding machines for solid planting a crop. More specifically, the seeding rows are so close together as to prevent cultivation and/or other cultural practices. The seed is kept in a large hopper which supplies a plurality of seed meters. An individual seed meter is associated with each planting unit. The seed meter in turn directs the metered seed through a seed tube to a seed boot having a seed passage. The seed boot is associated with a furrow opener which forms a planting furrow. The seed boot directs the seed into the planting furrow which is closed by a furrow closing wheel.

Deere & Company, the assignee of the present patent application, currently manufactures and markets a 1560 Series grain drill. This grain drill is provided with a single disc opener and a single casting seed boot. The furrow opener forms the planting furrow while the seed boot maintains the planting furrow open as the seed is being introduced. The lower portion of the seed boot are in continual contact with the soil during planting operations and are subjected to higher rates of wear than the upper portion. As the lower portion of the seed boot wears away, the farmer is forced to replace the total seed boot casting.

With air seeders an air stream is used to direct metered seed and fertilizer to a planting unit. On some air seeders, manufactured and marketed by Deere & Company, the planting unit is almost identical to the planting unit used on the 1560 Series grain drill described above.

SUMMARY

It is an object of the present invention to provide a two piece seed boot that can be used on a grain drill or an air seeder.

It is a feature of the invention that the lower portion of the seed boot can be replaced as it becomes worn without replacing the upper portion of the seed boot.

The present invention comprises a seed boot having an upper portion that is coupled to the seed tube and a lower portion that is coupled to the upper portion. Both the upper portion and the lower portion are castings. The upper portion is provided with an upper seed passage for receiving metered seed from the seed tube and for discharging metered seed to the lower portion. The lower portion is provided with a lower seed passage for receiving metered seed from the upper portion and for discharging seed to the planting furrow formed by the furrow opener and maintained by the seed boot.

The forward portion of the lower portion is provided with an upwardly and forwardly extending first mounting lug which engages a mounting recess located in the forward portion of the upper portion. The planting furrow side of the lower portion is provided with a second mounting lug that extends upward and engages the planting furrow side of the upper portion. The rear portions of both the upper portion and the lower portion are provided with aligned mounting holes for receiving a mounting bolt to hold the lower portion to the upper portion. A seed retaining tongue extends downwardly and rearwardly from the lower portion behind the lower seed passage for retaining seed deposited in the planting furrow. The upper portion of the tongue is received in a recess located between the upper and lower portions trapping the tongue therebetween.

DETAILED DESCRIPTION

Figure 1:
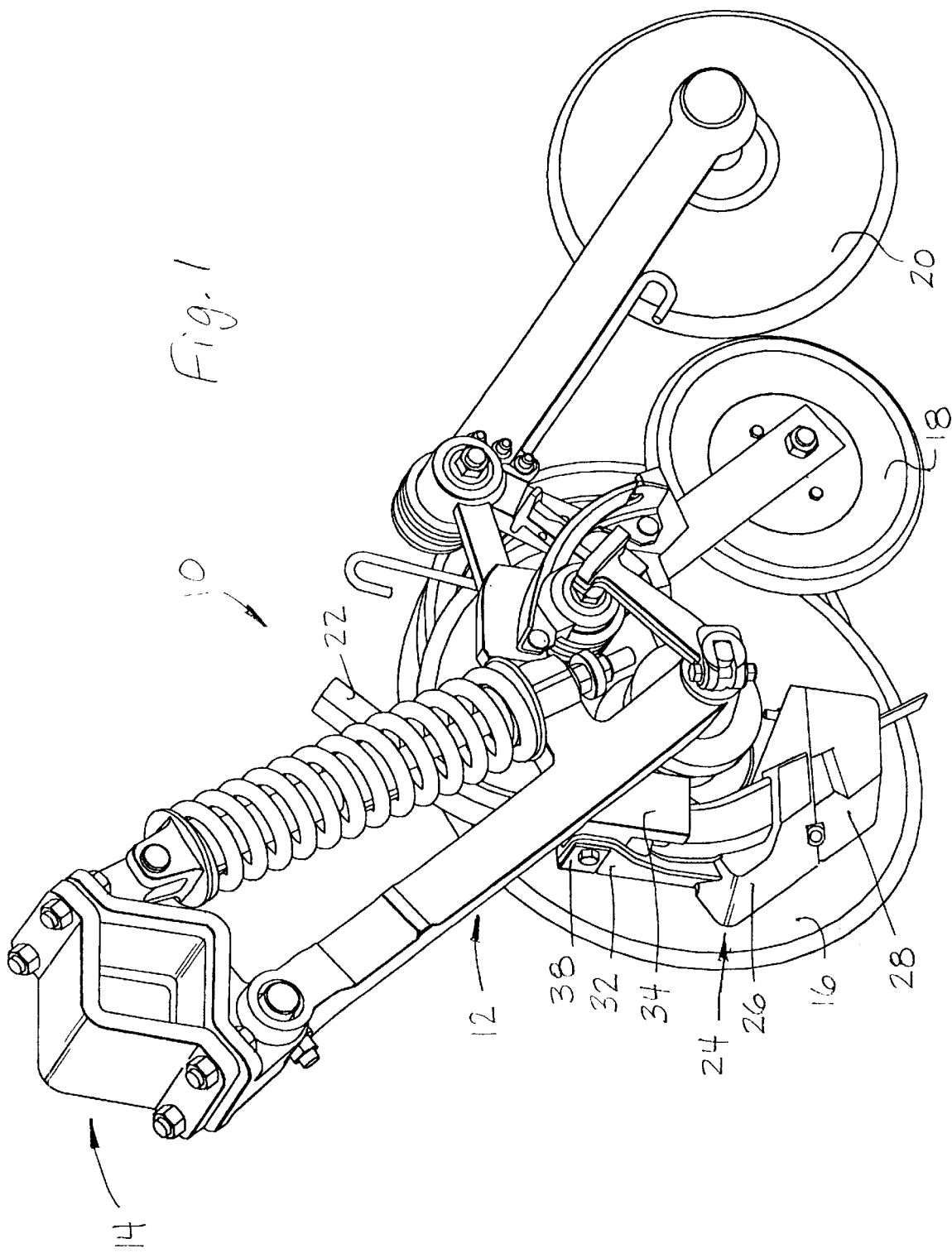
FIG. 1 is a perspective view of an individual planting unit for a seeding machine drill.

FIG. 1 discloses an individual planting unit 10 for a seeding machine. The planting unit has a pivotal frame 12 that is coupled to the seeding machine frame by clamping structure 14. A single disc furrow opener 16 is rotatively coupled to the frame 12. The furrow opener 16 forms a planting furrow into which the metered seeds are deposited. A seed lock wheel 18 is rotatively mounted to the frame 12 and is located behind the furrow opener 16 for pressing seeds into the planting furrow. Immediately behind the seed press wheel 18 is the closing wheel 20 for collapsing the planting furrow and covering the seeds with a loose layer of soil.

Metered seed from the seeding machine is directed to seed tube 22 which directs it downwardly into seed boot 24. The seed boot comprises an upper cast portion 26 and a lower cast portion 28. The upper cast portion comprises a cast body having an upper seed passage 30 for receiving seed from the seed tube 22. This seed passage 30 extends downwardly and rearwardly. The upper portion is also provided with an integral mounting clevis 32 having aligned holes for receiving pin 36 and strap 38 for mounting the upper portion 26 to the seed tube 22 and frame 12. The frame 12 is provided with a U-shaped mounting bracket 34 which fits between the mounting clevis 38 and the seed tube 22. The upper portion 26 is also provided with an upwardly extending mounting lug 40 which engages the sidewall 42 of seed tube 22.

Figure 2:
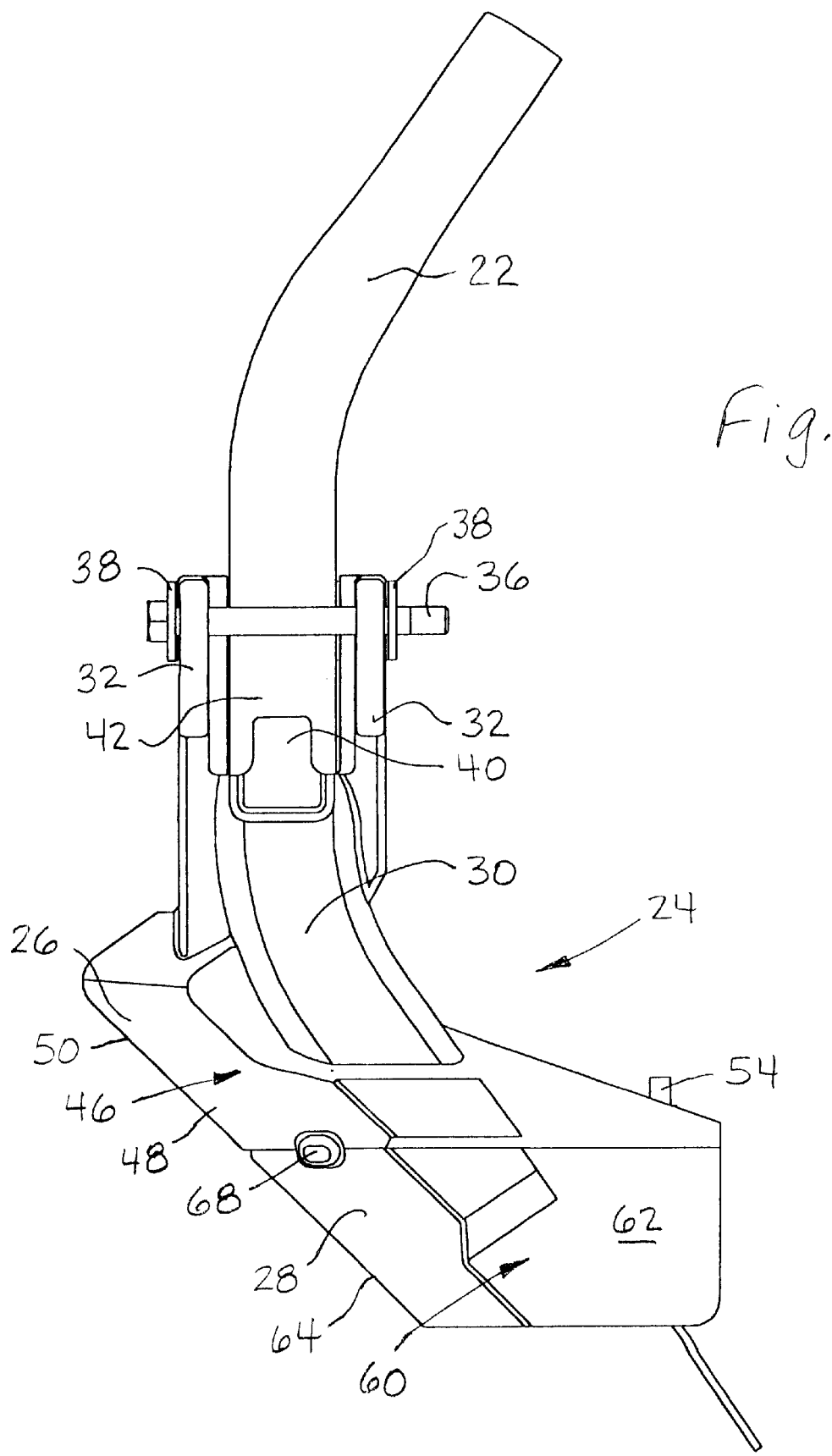
FIG. 2 is a perspective side view of the seed boot and seed tube showing the planting furrow side.
Figure 3:
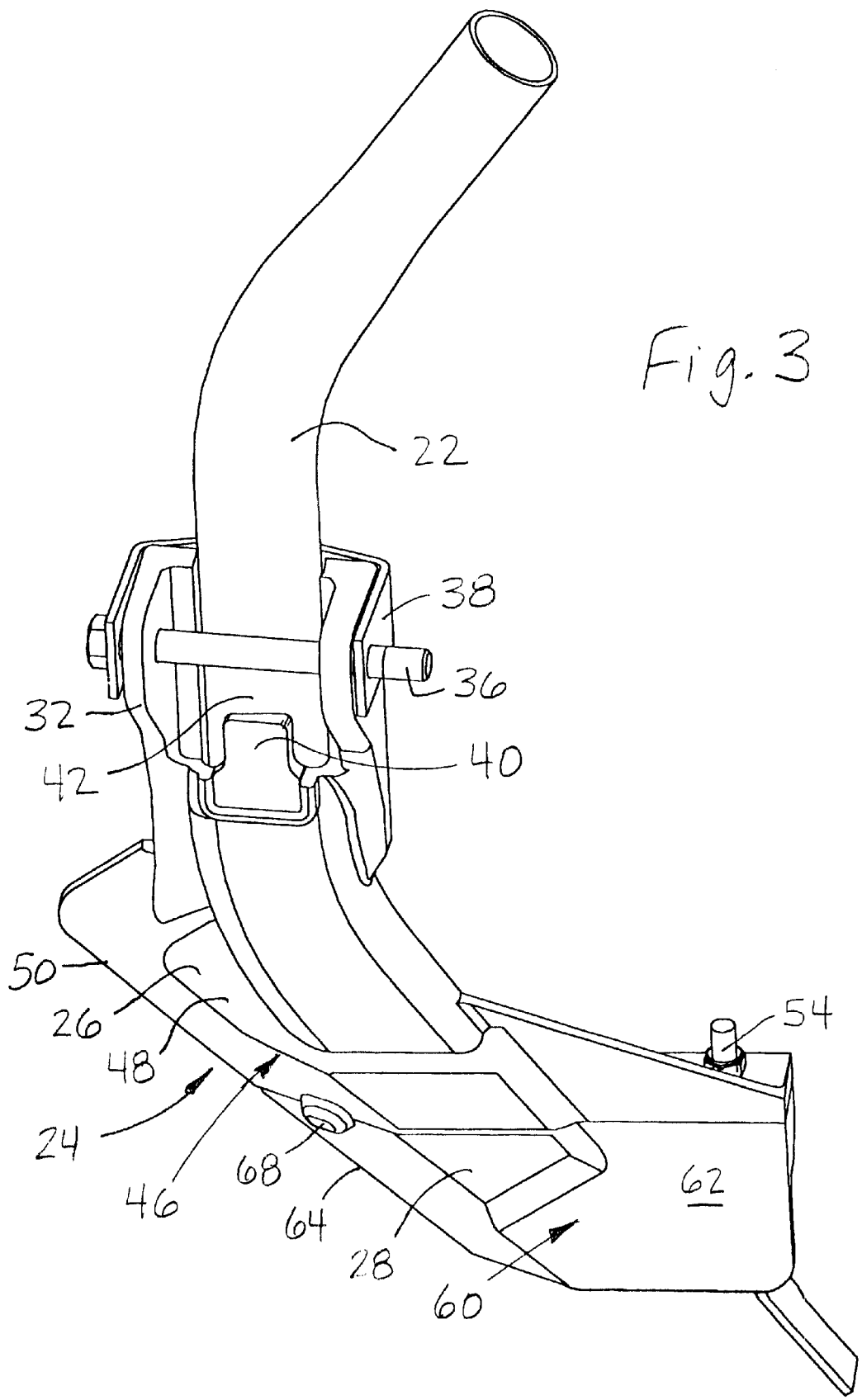
FIG. 3 is a perspective view of the seed boot and seed tube taken from the planting furrow side.
Figure 4:
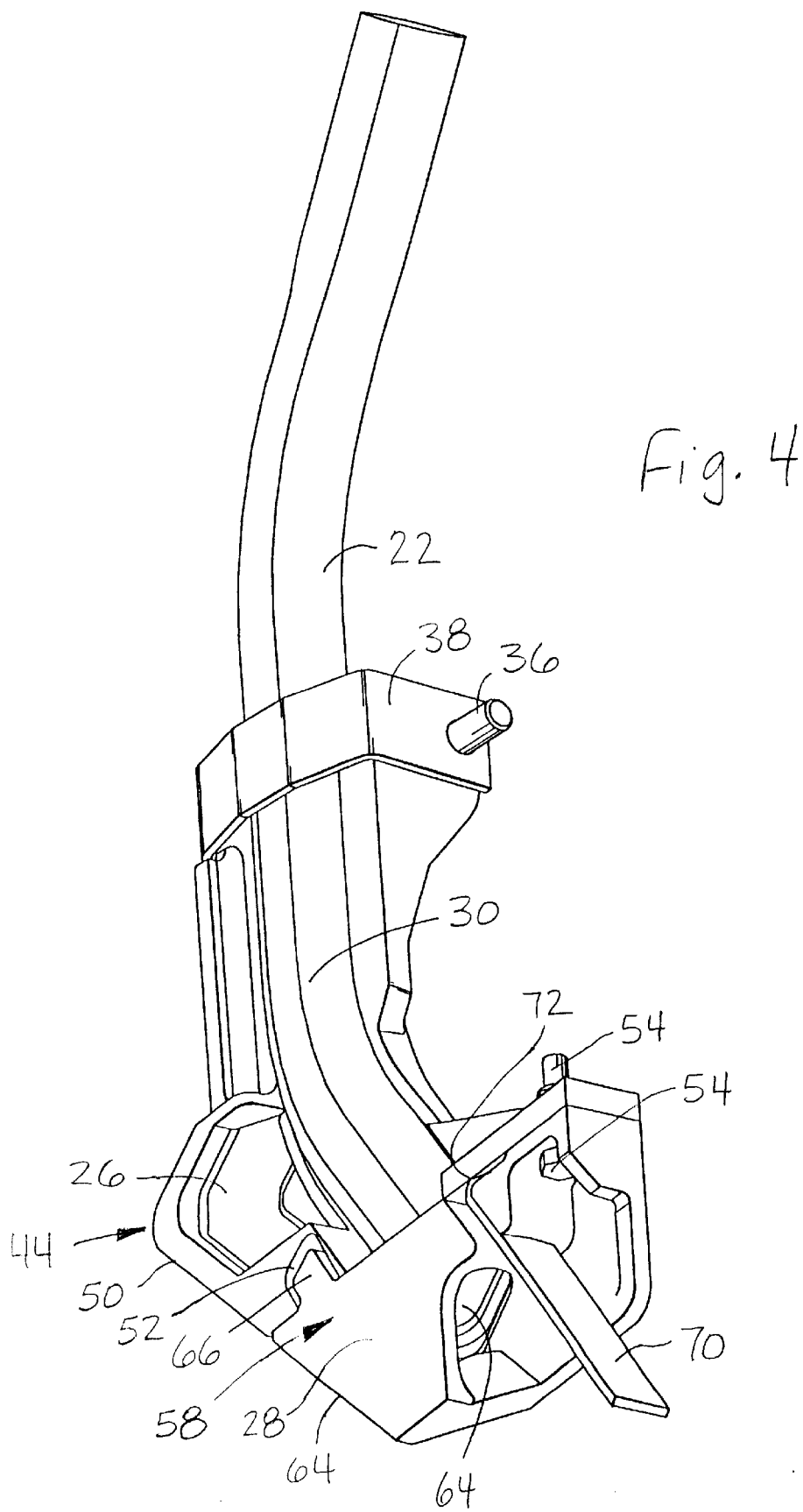
FIG. 4 is a perspective view of the seed boot and seed tube taken from the furrow opener side.

The upper portion has a furrow opener side 44, illustrated in FIG. 4, and a planting furrow side 46, illustrated in FIGS. 1–3. The planting furrow side 46 is provided with a surface 48 for engaging the sidewalls of the planting furrow formed by the furrow opener 16 and keeping the planting furrow opened as the seed is deposited in the planting furrow. The upper portion 26 is also provided with a leading edge 50 which is tucked up close to the inside surface of the furrow opener 16 and extends downwardly and rearwardly. A mounting lug receiving recess 52 is located behind the leading edge 50 on the furrow opener side 44 of the upper portion 26. The rear of the upper portion 26 is provided with a mounting hole for receiving a mounting bolt 54.

The lower portion 28 also has a furrow opener side 58, illustrated in FIG. 4, and a planting furrow side 60, illustrated in FIGS. 1–3. The planting furrow side 60 is provided with a surface 62 for keeping the planting furrow formed by the furrow opener 16 open. The lower portion 28 is provided with a lower seed passage 64 which is aligned with the upper seed passage 30 of the upper portion 26. In addition, the upper leading edge 50 is aligned with a lower leading edge 64 that also extends downwardly and rearwardly. The rear of the lower portion 28 is provided with a mounting hole which is aligned with the upper mounting hole for receiving mounting bolt 54.

The front of the lower portion 28 in front of the seed passage 64 is provided with a first mounting lug 66 which extends upwardly and forwardly and is received in mounting recess 52 in the upper portion 26. A second mounting lug 68 also extends upwardly from the lower portion 28 and engages the surface 48 on the planting furrow side 46 of the upper portion 26.

A seed retaining tongue 70, of plastic extends downwardly and rearwardly of the lower seed passage 64. It is trapped between the upper and lower portions being held in place by the recess 72 formed in the lower portion 28.

The invention should not be limited by the above described embodiment, but should be limited solely by the claims that follow.

What is claimed is:

1. A seed boot for a seeding machine, the seed boot comprising:

a cast upper portion adapted to be coupled to a seed tube for receiving metered seed therefrom, the upper portion having an upper seed passage, the upper portion also having an upper furrow opener side and an upper planting furrow side, wherein the upper planting furrow side has an upper side surface that is in contact with a planting furrow formed by a furrow opener for keeping the planting furrow open;

a cast lower portion that is coupled to the upper portion for receiving metered seed therefrom, the lower portion having a lower seed passage which is aligned with the upper seed passage for receiving metered seed from the upper seed passage, the lower portion having a lower furrow opener side and a lower planting furrow side, the lower planting furrow side has a lower side surface that is in contact with the planting furrow formed by the furrow opener for keeping the planting furrow open, the cast upper portion and the cast lower portion are provided with aligned mounting holes through which a mounting bolt passes coupling the lower portion to the upper portion, the upper portion is provided with an upper leading edge that extends downwardly and rearwardly and the lower portion is provided with a lower leading edge that extends downwardly and rearwardly and is in line with the upper leading edge, the upper furrow opener side of the upper portion is provided with an upwardly and forwardly extending mounting recess for receiving a first mounting lug extending upwardly and forwardly from the lower portion, the lower portion is provided with a second mounting lug extending upwardly therefrom and engaging the upper planting furrow side of the upper portion, the lower portion is provided with a recess which adjoins the upper portion for receiving a seed retaining tongue that extends rearwardly and downwardly behind the lower seed passage, the seed retaining tongue being trapped between the upper and lower portions.

2. A seed boot as defined by claim 1 wherein the upper portion is provided with an upwardly extending clevis for receiving a seed tube, the clevis is also provided with a strap and a pin for securing the upper portion to the seed tube.

3. A seed boot as defined by claim 2 wherein the upper portion is also provided with an upwardly extending mounting lug for engaging a sidewall on the seed tube.

4. An upper portion for a seed boot, the upper portion comprising:

a cast upper body having an upper seed passage formed therethrough, the cast upper body having a furrow opener side and a planting furrow side, the planting furrow side having a surface for keeping a planting furrow open, the cast body is further provided with an integral clevis for securing the upper portion to a seed tube, the clevis is provided with two aligned holes for receiving a pin which secures a strap to the clevis for securing the upper portion to the seed tube;

a mounting recess extending upwardly and forwardly on the furrow opener side and being located in front of the seed passage;

a mounting hole located behind the seed passage for receiving a mounting bolt for securing a lower portion to the upper portion of the seed boot.

5. An upper portion as defined by claim 4 wherein the upper portion is provided with a mounting lug for engaging a sidewall on the seed tube.

\* \* \* \* \*